United States Patent Office 2,749,211
Patented June 5, 1956

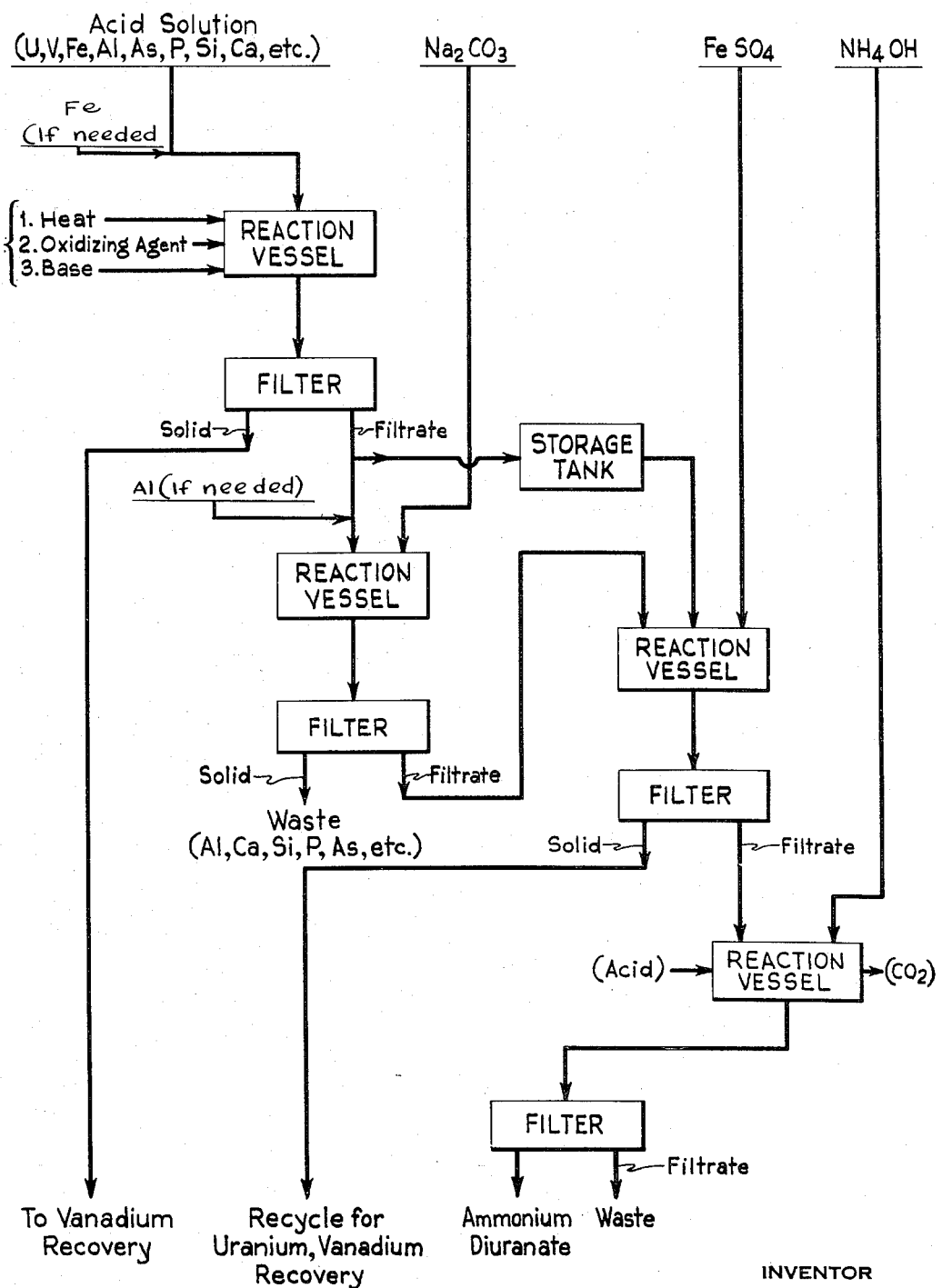

2,749,211
RECOVERY OF URANIUM AND VANADIUM COMPOUNDS FROM ACID SOLUTION

Adolph Q. Lundquist, Grand Junction, Colo., assignor to Union Carbide and Carbon Corporation, a corporation of New York Application November 19, 1952, Serial No. 321,309

3 Claims. (Cl. 23—14.5)

This invention relates to the separate recovery of uranium and vanadium compounds from acid solutions and has for its principal objects a method of effecting a sharp separation of uranium compounds from vanadium compounds and the production of a uranium compound substantially free from impurities.

In the treatment of carnotite ores by conventional methods, eventually an acid solution containing both uranium and vanadium compounds along with many impurities is produced. For example in the well known salt-roast procedure, the roasted ore is leached with acid to produce such a solution. Difficulty is experienced in recovering from these solutions pure uranium compounds or pure vanadium compounds. For instance, if the uranium is precipitated directly from such a solution a large quantity of vanadium is precipitated as well. Furthermore, the product of direct precipitation may be unduly contaminated with phosphorus and arsenic if these impurities are present in any significant amount in the solution.

These difficulties are avoided by the present invention which is a method of treating acid solutions containing compounds of uranium and vanadium and impurities which comprises precipitating vanadium as a compound of iron and vanadium from such solution; reacting the remaining solution with a strong base to precipitate the major portion of the impurities; precipitating any remaining vanadium and impurities from the resulting solution, the vanadium again being precipitated as an iron-vanadium compound; acidifying the remaining solution; and precipitating a diuranate from the solution.

The single figure of the drawing is a flow sheet of the method of the invention.

Referring to the flow sheet, in accordance with the invention an acid solution derived from treatment of an ore material containing uranium and vanadium together with the common impurities, such as iron, aluminum, arsenic, phosphorus, silicon and calcium compounds is fed to a suitable reaction vessel. At this point the vanadium and iron contents of the solution must be known, and the iron content must be at least sufficient to combine with all of the vanadium to form ferric vanadate (calculated as $FeVO_4$). If the solution is deficient in iron, more may be added as a ferric salt, for instance ferric sulfate. The solution is heated, not above its boiling point, and a sufficient quantity of a suitable oxidizing agent, for instance sodium chlorate or chlorine, is added to the solution to insure that all of the vanadium is present as vanadic oxide ($V_2O_5$). By the addition of an alkaline reagent, suitably sodium carbonate or ammonium hydroxide, the pH of the solution is adjusted to 2.2 to 3.5, and ferric vanadate is thereby precipitated. The precipitate is separated by filtration and is retained for recovery of vanadium therefrom by suitable methods.

The filtrate contains the uranium values originally present in the starting solution together with impurities. In accordance with the invention the impurities are removed as alumina complexes; consequently the alumina content of the filtrate must be sufficiently high to combine with the impurities present. If the alumina content is too low, it is increased by the addition of an aluminum salt such as alum. Generally, it is advisable to provide a substantial excess of aluminum compounds over that theoretically required to combine with all of the impurities present. The aluminum content of the solution having been adjusted if necessary, the solution is fed into a strong, hot solution of sodium carbonate (soda ash) until the resulting mixed solution is neutral to phenolphthalein. By this inverse precipitation step, the impurities in the solution are precipitated along with alumina. The precipitate is removed by filtration, and may be discarded.

The uranium values originally present in the acid starting solution are contained in the filtrate which also contains small quantities of vanadium not previously precipitated as ferric vanadate. To remove the vanadium the filtrate is placed in a suitable reaction vessel, and a portion of the filtrate previously obtained on separation of the ferric vanadate precipitate is fed to the vessel until excess bicarbonate in the liquor is about 0.5% to 2% calculated as $CO_2$. Sufficient ferrous sulfate is now added to combine with all of the vanadium in the liquor to form ferrous vanadate calculated as $Fe_3(VO_4)_2$ which is precipitated. The precipitate also contains small quantities of residual impurities and traces of uranium. It is removed by filtration, washed, and recycled for recovery of uranium and vanadium therefrom. For instance, if low in uranium it may be combined with the ferric vanadate previously produced or if high in uranium may be treated separately for recovery of uranium.

The filtrate is now in condition for precipitation of a substantially pure uranium compound. It is first acidified, suitably with sulfuric acid, to release carbon dioxide. After evolution of carbon dioxide an alkaline reagent is added to precipitate a diuranate. The preferred reagent is ammonium hydroxide which causes the precipitation of ammonium diuranate. The precipitate is removed by filtration, washed and dried. The filtrate may be discarded.

The method of the invention effects a sharp separation of uranium compounds from vanadium compounds and makes possible the good recovery of a uranium compound substantially free of impurities as will be evident from the following specific example of a typical operation conducted in accordance with its principles.

An acid solution containing 1.75% uranium as $U_3O_8$ and 1.90% vanadium as $V_2O_5$ also contained .43% iron, .151% phosphorus, .075% arsenic and 5.40% alumina. Ferric sulfate was added to the solution in an amount sufficient to raise the iron content to .64%. The iron content having been adjusted, the solution was heated to about 85° F. and ⅙ part by weight of sodium chlorate per part of contained vanadium was added to ensure that all vanadium was present as $V_2O_5$. Ammonium hydroxide was then added to the solution until its pH was 3, and ferric vanadate was precipitated. The precipitate was removed by filtration, washed, and set aside for vanadium recovery. It contained 29.5% vanadium calculated as $V_2O_5$ and only .62% uranium calculated as $U_3O_8$.

The filtrate contained 1.05% uranium calculated as $U_3O_8$. It also contained 3.20% alumina, .11% phosphorus and .003% arsenic. Since the alumina content was thus at least about 2.5 times the theoretical amount required to combine with the arsenic and phosphorus to form phosphates and arsenates of aluminum, it was unnecessary to add alum (aluminum sulfate) to raise the aluminum content of the liquor in this case. The solution was then fed into a strong (25%) solution of soda ash which was maintained at a temperature of about 55° F. until the resulting mixture was neutral to phenolphthalein. The precipitate which was formed was removed by filtration and discarded. It contained 8.5% Al, 1.01% P and .055% As.

The filtrate contained .97% uranium calculated as $U_3O_8$ and .005% vanadium calculated as $V_2O_5$. To it was added filtrate derived from the precipitation and separation of ferric vanadate, sufficient being added to reduce the bicarbonate content of the mixture to 1%. Ferrous sulfate in sufficient amount to combine with soluble vanadium was then added to precipitate the vanadium as ferrous vanadate. The precipitate was removed by filtration and preserved for recovery of uranium and vanadium therefrom. It contained 1.79% vanadium as $V_2O_5$ and 4.40% of uranium as $U_3O_8$.

The filtrate was acidified with sulfuric acid until evolution of carbon dioxide ceased whereupon ammonium hydroxide was added until precipitation of ammonium diuranate was complete. The precipitate was removed by filtration, washed and dried. It contained 88.17% of uranium as $U_3O_8$, .26% of vanadium as $V_2O_5$, .025% phosphorus, and .003% arsenic. The recovery of uranium from the original starting solution was 99.5% including the recycle residue.

From the above example it is apparent that the invention provides an effective process for recovering a substantially pure uranium compound from acid solutions, containing both uranium and vanadium compounds and undesirable impurities.

What is claimed is:

1. A method of recovering separately vanadium compounds and uranium compounds from acid solution containing, in addition to vanadium and uranium compounds, impurities including iron, aluminum, phosphorus and arsenic, which method comprises providing in such solution sufficient ferric iron to combine with all of the vanadium in such solution, heating the solution to a temperature not above its boiling point and adding an oxidizing agent to cause all of the vanadium to be present as pentoxide; adding an alkaline reagent to the solution to adjust its pH to 2.2 to 3.5, thereby causing ferric vanadate to be precipitated while said uranium compounds and impurities are retained in solution; separating ferric vanadate from the remaining solution; dividing the remaining solution into two portions; providing in one portion of said solution aluminum in an amount substantially in excess of that theoretically required to react with said impurities; adding said solution to a hot, concentrated solution of sodium carbonate until the resulting mixture is substantially neutral to phenolphthalein and thereby precipitating compounds of said aluminum and said impurities while retaining uranium compounds in solution; separating the precipitate from said solution; combining the solution with a portion of solution remaining after separation of ferric vanadate therefrom to lower the excess bicarbonate concentration of the resulting mixture to 0.5% to 2% calculated as $CO_2$; adding ferrous iron to said mixture of solutions and thereby precipitating therefrom, together with residual impurities, any retained vanadium as ferrous vanadate while retaining uranium compounds in solution; separating the precipitate from the solution; acidifying said solution to release carbon dioxide therefrom; and adding to said solution an alkaline reagent thus precipitating a diuranate therefrom.

2. A method as claimed in claim 1 in which both said first-mentioned and said second-mentioned alkaline reagents are ammonium hydroxide and said diuranate is ammonium diuranate.

3. A method as claimed in claim 1 in which said ferrous iron is ferrous sulfate.

References Cited in the file of this patent

UNITED STATES PATENTS 2,176,610    Stamberg               Oct. 17, 1939